United States Patent [19]

Atalla

[11] 4,288,659
[45] Sep. 8, 1981

[54] METHOD AND MEANS FOR SECURING THE DISTRIBUTION OF ENCODING KEYS

[75] Inventor: Martin M. Atalla, Menlo Park, Calif.

[73] Assignee: Atalla Technovations, Sunnyvale, Calif.

[21] Appl. No.: 40,687

[22] Filed: May 21, 1979

[51] Int. Cl.³ .............................................. H04L 9/00
[52] U.S. Cl. .............................. 178/22.08; 235/379; 235/382; 340/149 R; 178/22.09
[58] Field of Search ............................ 178/22; 375/2; 340/149 R, 149 A; 235/380, 379, 382

[56] References Cited

U.S. PATENT DOCUMENTS

| | | | |
|---|---|---|---|
| 3,956,615 | 5/1976 | Anderson | 178/22 |
| 4,123,747 | 10/1978 | Lancto et al. | 340/149 A |
| 4,186,871 | 2/1980 | Anderson et al. | |
| 4,193,131 | 3/1980 | Lennon et al. | 375/2 |
| 4,203,166 | 5/1980 | Ehrsam et al. | 375/2 |

Primary Examiner—Howard A. Birmiel
Attorney, Agent, or Firm—A. C. Smith

[57] ABSTRACT

An improved secured data transmission system relies on the favorable comparison of coded signals derived from information about authorized individuals and particular data terminals that is both prestored and subsequently supplied under manual command in order to generate an operating key which is then used to encode and decode data that is entered after the initialization procedure.

6 Claims, 2 Drawing Figures

METHOD AND MEANS FOR SECURING THE DISTRIBUTION OF ENCODING KEYS

RELATED CASES

This application refers to subject matter disclosed in U.S. patent application Ser. No. 009,532, filed Feb. 5, 1979, which is a continuation-in-part of U.S. patent application Ser. No. 003,898, filed Jan. 16, 1979, which is a continuation-in-part of U.S. patent application Ser. No. 902,444, filed May 3, 1978.

BACKGROUND AND SUMMARY OF THE INVENTION

Certain known systems for securing the transmission of data between locations rely upon computer-operated terminals as input and output devices. These terminals commonly include an encoding module which encrypts applied data so that the subsequent transmission thereof to a remote location remains secured against unauthorized reception, alteration or duplication. The encoding module is commonly controlled by an encoding key which is only known to one or two trusted persons, but which nevertheless must be changed periodically to assure continued integrity of the secured data-transmission system.

In the banking industry where secured-data transmission systems of this type have become widely used, it is common practice to allow a bank officer to initially establish the encoding key at each terminal at the start of operations for the day. This encoding key most usually must also be established at a remote end of the transmission system (say, at the central processor of the bank) in order to facilitate the decryption of transmitted and received encrypted data, and to permit the encryption of return messages that can then be decrypted according to the same key at the receiving terminal.

Previous schemes for disseminating the encoding key for use at remote locations have included too many people who thereby obtain sufficient information about the encoding key to seriously degrade the security of the system against unauthorized use of the encoding key by individuals who have access to the system from within the bank or from along the transmission system.

In accordance with a preferred embodiment of the present invention, encryption and decryption keys for controlling the encoding and decoding of secured, transmitted data are generated and distributed over the secured transmission system without the involvement of additional individuals than the person who initializes the system, and who may not even learn about the operating encoding key for himself. This is accomplished by relying on a secret code number or word or phrase which is selected by and known only to an authorized individual, which code (called a Personalized Individual Number or Code or Phrase) is combined in logical manner with an identification number for the terminal and a sequence number (or date, or random number, etc.) to produce a pair of codes, one of which remains stored in the terminal as an initialization key and the other of which (TRAC) can then be sent to the central processor at a remote location for proper analysis.

At the central processor, the PIN (or PIC or PIP) for the authorized individual (and for all other authorized individuals) is retained in storage (preferably in encrypted form with its requisite encrypting key) along with the identification number of the terminal (and all other terminals included within the system). Thus, the central processor may regenerate the authorized individual's PIN for use within the processor only by decrypting the stored encrypted PIN using the stored encryption key code. The PIN and the terminal identification number accessed from the processor memory may be combined in the same logical manner as at the identified terminal to yield a pair of codes, namely, a TRAC and an initialization key. The TRAC thus generated, and the TRAC transmitted and received from the remote terminal may then be compared for parity. Upon detection of parity, any set of numbers may be randomly selected for encoding to provide the session key, and this session key may be encoded with the initialization key to produce an encrypted session key for transmission back to the identified terminal. Since the session key actually determines the encryption/decryption for the day (or other session period), it is only necessary to decrypt the encrypted session key as received back at the terminal using the initialization key stored therein to produce the requisite session key. Thereafter, the initialization key can be discarded. In accordance with this embodiment of the invention, the users of a terminal cannot know the session key, and other terminals cannot be used to intercept a message selected for transmission to one terminal. In addition, terminals cannot simply be connected unauthorizedly into the system because of the need for proper initial conditioning.

DESCRIPTION OF THE PREFERRED EMBODIMENT

Figure 1:
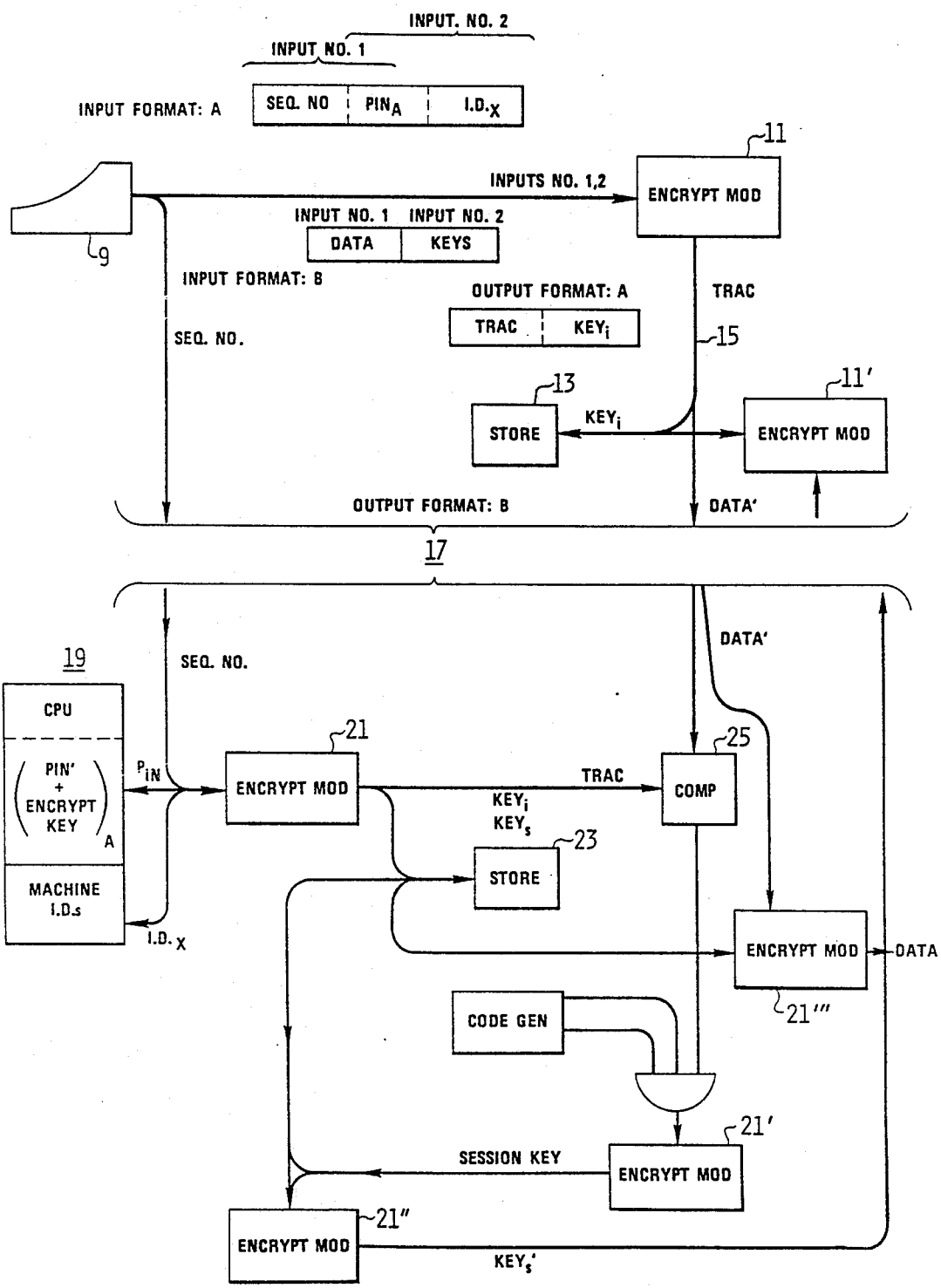
FIG. 1 is a simplified block schematic diagram of one embodiment of the present invention.
Figure 2:
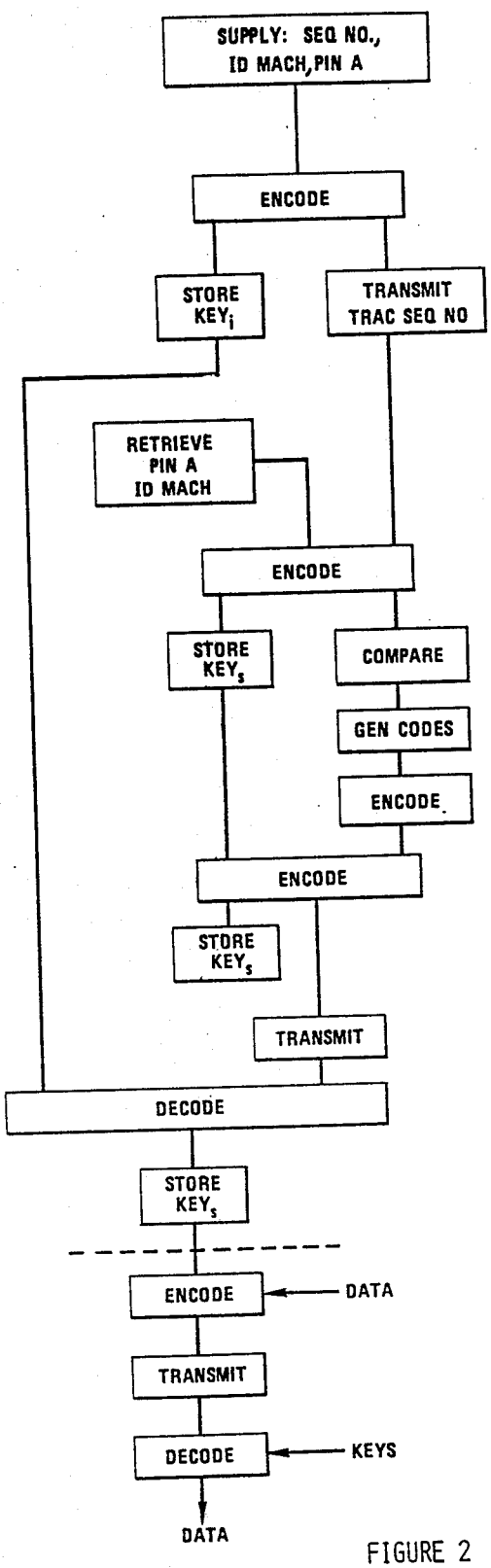
FIG. 2 is a chart showing the steps by which a secured data transmission system is initialized in accordance with the present invention.

Referring now to the block diagram of FIG. 1 and to the chart of FIG. 2, there is shown an input device 9 such as a keyboard as part of a data terminal. The keyboard enables an operator to enter data, a Personal Identification Number (PIN), and the like. In addition, the input device 9 may be capable of supplying a predetermined machine identification number (I.D.$_x$), for example, by accessing a register by a single keystroke to produce the machine number I.D.$_x$.

Also, as part of a data terminal, there is provided an encryption module 11 of the type, for example, referred to as a data encryption standard utilizing the National Bureau of Standards circuit chip (available from various semiconductor component suppliers). A pair of input signals to the encryption module 11 may be provided using the illustrated format or any other suitable format which provides two inputs from at least the PIN from the authorized individual, the machine identification number, and a sequence number which may be a random number, one of a sequence of numbers, a date, time, etc. The sequence number assures that the encrypted output number will be different for each initialization operation performed. In addition, the data terminal may also include a storage register 13 for storing key codes during the operation thereof.

In operation, the data terminal must be initialized in the first operating cycle A to establish an operating key code that, ideally, is different for each business day or other operating session. The key code for the terminal will be used to encrypt data for secured transmission, say, to a central processor at a remote location. An authorized individual enters his personal identification number $PIN_A$ via the input device 9, and this number is combined with the identification number of the machine and a sequence number in a conventional manner to produce a pair of input signals for the encryption module 11 having a signal format as illustrated. The encryption module 11 of the type described encodes one input number as a function of the other input number (each 56 to 64 bits long) to produce an output signal which may be considered as including an initializing-key code number, $Key_i$, in the least significant bits, say, 56 bits, and a TRansmission Authentication Code in the remaining most significant output bits. The initializing-key code number, $Key_i$ is stored in storage register 13, and the TRAC signal is transmitted over any suitable data transmission link 17 to the central processor at a remote location.

The central processor 19 includes a memory file which contains all the identification numbers for all data terminals that are properly connected within the system. This memory file also contains all of the personal identification numbers (ideally, in encrypted form with associated encryption key) for all individuals who are authorized to initialize a terminal. Thus, an encryption module 21 (of the NBS-type previously described) at the remote location may operate with the central processor 19 to regenerate the $PIN_A$ (for internal use only) from information in the storage file. A pair of input signals may then be provided in the same format as used with module 11, using the regenerated $PIN_A$, the received sequence number, and the machine identification number $I.D._x$ for the terminal being initialized. This module also generates an initializing-key code number ($Key_i$) which can be stored in a register 23, and a TRAC signal which can be compared in comparator 25 with the TRAC signal that was produced and transmitted by the terminal being initialized. These TRAC signals should compare favorably, if the machine-identifying numbers are the same and the proper $PIN_A$ for an authorized individual was entered and the transmitted TRAC signal and sequence number were received unaltered.

Upon favorable comparison of the two TRAC signals in comparator 25, a pair of code numbers (e.g., random numbers) from generator 27 may then be gated into encryption module 21' of the NBS-type previously described using the requisite input-signal format also previously described. Of course, modules 21, 21', 21" and 21'" may all be the same module operating under control of the central processor during different portions of the operating cycle to perform the encoding or decoding described herein. The entire encrypted output from module 21' may be regarded as the encryption key for the session ($Key_s$), and this may be encrypted in module 21" with the initializing key ($Key_i$) from the storage register 23. The resulting encrypted session key ($Key'_s$) may then be transmitted back to the data terminal over the data link 17, and the initializing key ($Key_i$) previously stored in register 23 may now be discarded and replaced with the session key ($Key_s$).

At the data terminal, the encrypted session key ($Key'_s$) is received from the central processor via the data transmission link 17, and is applied to a reversible encryption module 11' of the NBS-type previously described, along with the initializing key ($Key_i$) from storage register 13. Of course, the modules 11 and 11' may be the same module operated in sequential states of the data terminal to perform the encoding or decoding functions described herein. The resulting decoded output from module 11' is the session key ($Key_s$) which can be stored in register 13. The initializing key ($Key_i$) may be discarded and replaced with the session key ($Key_s$) to complete the initialization of the data terminal.

After the initialization of the data terminal, as just described, input data may be encrypted during the second operating cycle B by inserting the data via input device 9 as one input to the encryption module 11 and by applying the session key ($Key_s$) from register 13 as the other input of the encryption module. The resulting encrypted data may be transmitted via data link 17 to the central processor. There, it is applied as one input to module 21'", and the session key ($Key_s$) from register 23 is supplied as the other input to module 21'". This module, operating as a decoder, thus regenerates the data that was previously received in encrypted form.

Therefore, the present invention provides the method and means for establishing an encrypting key which need not be known even to authorized individuals once it is properly established by such an individual. Also, since the encryption key is established using data which must be on file about a terminal, it is conveniently possible to exclude the unauthorized connection of additional terminals within the system of the present invention.

I claim:
1. Data-handling apparatus for securing the transmission of data under control of an authorized individual from one location having an identification number to data processing means having memory means with the identification number stored therein at a remote location, the apparatus comprising:
   encrypting means at the one location and remote location, each for producing first and second encoded outputs as a logical combination of a pair of signals applied thereto;
   input means at the one location coupled to the encrypting means for applying a pair of signals thereto which are representative of the identification number for the one location and of a code signal associated with the authorized individual;
   at the one location, storage means for storing the first encoded output produced by the encrypting means;
   at the remote location, data processing means having memory and storing the identification number for the one location and storing the code signal associated with the authorized individual;
   said encrypting means at the remote location being coupled to receive the identification number and the code signal from the memory of the data processing means to produce first and second encoded outputs as said logical combination of signals applied thereto;
   storage means at the remote location for storing the first encoded output from the encrypting means thereat;
   comparator means responsive to the second encoded outputs received from each of said encrypting means for producing an enabling output in response to favorable comparison of said second encoded outputs;
   means responsive to said enabling output for producing a key code;
   means for transmitting to the one location an encrypted key code as the second logical combina- tion of said key code and the first encoded output from the storage means at said remote location;

means at said one location for decrypting the encrypted key code received thereat with respect to the first encoded output stored thereat and the second logical combination to produce the key code; and means at said one location and said remote location for encoding and decoding data thereat with respect to the same logical manipulation of an applied signal and said encoding key.

2. Apparatus as in claim 1 wherein:

said input means at the one location provides an auxiliary code signal in response to manual actuation thereof, and applies to said encrypting means at the one location a pair of signals representative of the auxiliary code signal, the identification number for the one location and the code signal associated with the authorized individual; and said encrypting means at the remote location being coupled to receive the auxiliary code signal from the input means and the identification number and code signal from the memory of the data processing means for producing the first and second encoded outputs as said logical combination of a pair of signals applied thereto.

3. Apparatus as in claim 1 comprising code-generating means responsive to said enabling signal for producing said key code as a logical manipulation of signals from the code-generating means.

4. The method of securing the transmission of data under control of an authorized individual from one location having an identification number to a remote location at which the identification number is stored, the method comprising the steps of:

encrypting at the one location a pair of signals which are representative of at least a code signal from the authorized individual and the identification number for the one location to produce first and second encoded outputs as a logical combination of the pair of signals;

storing the first encoded output at the one location;

storing the code signal from the authorized individual at the remote location;

encrypting at the remote location a pair of signals representative of at least the stored code signal from the authorized individual and the stored identification number for the one location to produce first and second encoded outputs as said logical combination of the pair of signals;

comparing second encoded signals produced by the encryption of a pair of signals at the first location, and by the encryption of a pair of signals at the remote location to enable the formation of a key code upon favorable comparison of the second encoded outputs;

producing an encrypted key code as a logical manipulation of the key code and the first encoded output produced at the remote location;

producing the key code from the encrypted key code received at the one location by decoding the encrypted key code with respect to said logical manipulation and the first encoded output stored at the one location; and encoding and decoding data at said one and remote locations with respect to the key code produced at said locations.

5. The method as in claim 4 wherein the steps of encrypting at both the one location and remote location are performed on the respective pairs of signals which also are representative of at least a sequence number produced at the one location and transmitted to the remote location.

6. The method as in claim 4 wherein the formation of the key code includes the steps of:

generating code numbers; and encoding the generated code numbers to produce the key code in response to favorable comparison of said second encoded output signals.

* * * * *